(No Model.)

W. H. CORNFORD, Jr.
PHOSPHATE SOWER.

No. 279,135. Patented June 12, 1883.

WITNESSES
William R. Brooks.
Milton P. Comford.

INVENTOR
William H. Cornford Jr.

UNITED STATES PATENT OFFICE.

WILLIAM H. CORNFORD, JR., OF PHELPS, NEW YORK.

PHOSPHATE-SOWER.

SPECIFICATION forming part of Letters Patent No. 279,135, dated June 12, 188?.

Application filed February 16, 1883. (No model.)

*To all whom it may concern:*

Be it known that I, WILLIAM H. CORNFORD, Jr., a citizen of the United States, residing in the town of Phelps, county of Ontario, and State of New York, have invented an Improved Phoshate-Sower for Grain-Drills, of which the following is a specification.

The object of my invention is to provide an apparatus which shall be attached to or be made a part of a grain-drill, which shall by a positive or force feed deliver a given amount of phosphate into the tubes of the drill in a certain manner and quantity and without danger of clogging.

Figure 1:
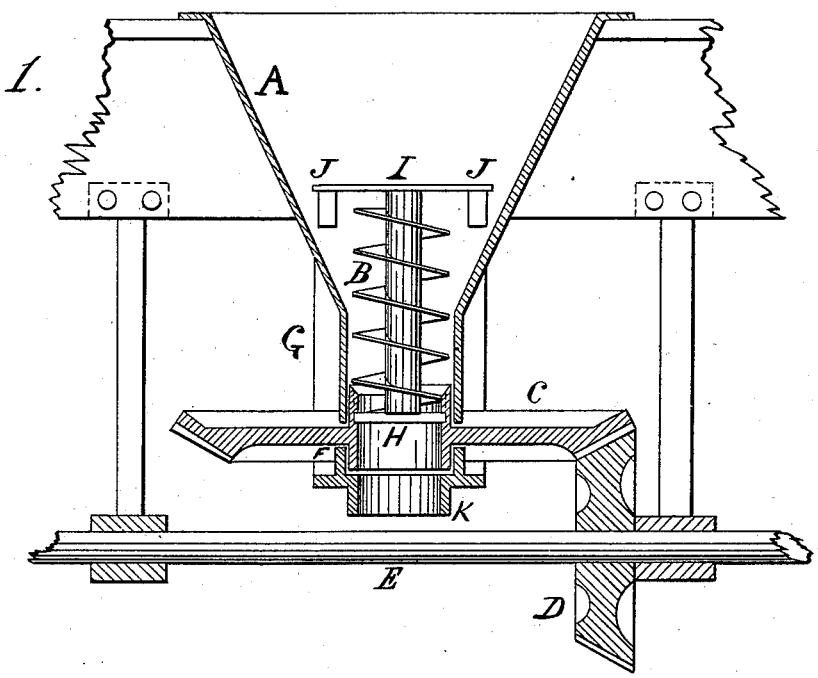
Figure 2:
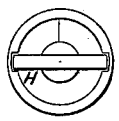
Figure 3:
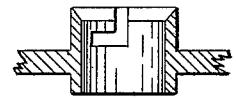

Figure 1 represents in the accompanying drawings a rear elevation, mostly in section, of my improved phosphate distributer or sower, which, it must be understood, is but one of several duplicate attachments, arranged along the whole length of the grain-box to the rear of each grain-distributer. Figs. 2 and 3 are detailed views.

A represents a conical hopper or well attached to the bottom of a box holding the supply of phosphate to be sown. The hopper and the rest of the device are preferably constructed of metal. The lower part of the hopper is cylindrical, as shown, and turning freely within this is a worm or spiral, B. The worm is driven by the bevel-gears C and D, the latter being fastened to the shaft E, which runs the whole width of the grain-drill, and is turned by the drive-wheels in any approved method. The hollow hub of the wheel C is made quite thin and revolves within the cylindrical part of the hopper A. The lower part of the hub revolves in a cylindrical collar, F, formed on the bracket G, which bracket is bolted to the box above or to a part of the frame of the machine. The worm B engages with the wheel C by means of a narrow cross-arm, H, (shown also in Fig. 2,) made on the bottom of the spiral or worm, the ends of which arm slip into a right-angled notch or groove made in opposite sides of the hub of the wheel C, one of which notches is shown in Fig. 3. This permits the removal of the worm from the wheel and hopper at any time by a slight turn and upward pull. At the top of the worm is an agitator formed of the narrow cross-piece I and pendent blades J J, which are set at an angle with the plane of revolution and tend to draw the phosphate toward the worm. It will be readily seen that the rotation of the worm, as the machine is drawn along, will continuously withdraw a certain quantity of the phosphate from the hopper, and, escaping from the bottom of the worm, fall through the hollow hub of the wheel C and tube K either directly or by means of a connecting-tube, into the usual grain-tubes of the drill. The amount thus sown is regulated by the velocity of the worm, and can be changed to any desired extent by suitable gearing connected with the shaft E.

Having thus described my invention, what I claim, and desire to secure by Letters Patent, is—

The combination of the worm B, constructed with its cross-arm H and agitator I J J, as described, with the conical and cylindrical hopper A, hollow and notched hubbed wheel C, bracket G, collar F, and tube K, substantially as described.

WILLIAM H. CORNFORD, JR.

Witnesses:
 WILLIAM R. BROOKS,
 WM. B. HOTCHKISS.